US005979878A

United States Patent [19]

Blankenship

[11] Patent Number: 5,979,878

[45] Date of Patent: Nov. 9, 1999

[54] MOTORCYCLE STAND APPARATUS

[76] Inventor: Ernest Blankenship, Box 439, Vansant, Va. 24656

[21] Appl. No.: 09/109,237

[22] Filed: Jun. 30, 1998

[51] Int. Cl.[6] .......... B60P 1/48

[52] U.S. Cl. .......... 254/131; 254/10 C

[58] Field of Search .......... 254/10 C, 10 R, 254/4 C, 4 R, 131, 127, 128

[56] References Cited

U.S. PATENT DOCUMENTS

| | | | |
|---|---|---|---|
| 388,516 | 8/1888 | Wilson | 254/10 C |
| 1,958,292 | 12/1934 | Barrett . | |
| 2,934,220 | 4/1960 | Murphy | 254/10 C |
| 3,306,579 | 2/1967 | Campbell . | |
| 4,534,544 | 8/1985 | Heide . | |
| 4,632,627 | 12/1986 | Swallows . | |
| 5,518,224 | 5/1996 | Anderson . | |
| 5,769,396 | 6/1998 | Tischendorf | 254/10 C |

*Primary Examiner*—Robert C. Watson

[57] ABSTRACT

A motorcycle stand apparatus includes a base frame assembly which includes two longitudinal frame members and a transverse frame member connected between the two longitudinal frame members. A first leg assembly is provided, and a pair of first leg bottom pivots are connected between a bottom end of the first leg assembly and the two longitudinal frame members. A second leg assembly has a top end and a bottom end, and a pair of second leg bottom pivots are connected between the bottom end of the second leg assembly and the two longitudinal frame members. A lift platform has a first platform side and a second platform side. A pair of first leg top pivots are connected between the top end of the first leg assembly and the first platform side and the second platform side. A pair of second leg top pivots are connected between the top end of the second leg assembly and the first platform side and the second platform side. Pull cables are connected between a push plate assembly and the first leg assembly. Lift platform stops are located on either the first leg assembly or the second leg assembly for stopping vertical descending motion of the lift platform in a direction towards the push plate assembly. In use, a motorcycle is rolled against the push plate assembly, and the momentum of the rolling motorcycle is used to lift the lift platform and a portion of the motorcycle off of the ground.

5 Claims, 4 Drawing Sheets

MOTORCYCLE STAND APPARATUS

BACKGROUND OF THE INVENTION

1. Field of the Invention

The present invention relates generally to devices for aiding in the repair and maintenance of motorcycles and, more particularly, to stands especially adapted for elevating and supporting a motorcycle.

2. Description of the Prior Art

To repair and carry out maintenance procedures on a motorcycle, it is often desirable to lift the rear wheel of the motorcycle off of the ground. Throughout the years, a number of innovations have been developed relating to lifting devices which can be used with motorcycles, and the following U.S. patents are representative of some of those innovations: 1,958,292, 3,306,579, 4,534,544, 4,632,627, and 5,518,224. More specifically, U.S. Pat. No. 1,958,292 discloses a lifting device that employs hydraulic cylinders and ratchets for locking portions of the lifting device in an elevated position. For purposes of simplicity and economy, it would be desirable if a lifting device for a motorcycle could be provided that does not employ hydraulic cylinders and locking ratchets.

U.S. Pat. No. 3,306,579 discloses a hoisting device that employs a parallelogram lifting structure. The parallelogram lifting structure is a strong and efficient lifting structure, and the structure is operated by a handle. In addition, locking ratchets are employed to keep the parallelogram lifting structure in an elevated position once it is lifted. Since a load, such as a motorcycle, often needs to be moved and balanced with a person's hands, it would be desirable if a motorcycle lifting device could be operated in a hands-free manner so that the person's hands can remain on the motorcycle even as the lifting device is being employed.

U.S. Pat. No. 4,534,544 relates to a lifting device employing rollers that roll along the ground as a device is lifted by the lifting device. Sometimes a motorcycle needs to be lifted on relatively soft ground. In such a case, it is conceivable that rollers would dig into the ground and may impede a lifting action. In this respect, it would be desirable if a motorcycle lifting device does not have ground-engaging rollers that contact the ground as the motorcycle is being lifted.

U.S. Pat. No. 4,632,627 relates to a lifting device that employs a hand-cranked winch for lifting a load. As mentioned above, it would be desirable if a motorcycle lifting device could be operated in a hands-free manner.

U.S. Pat. No. 5,518,224 discloses a motorcycle lift stand which employs a parallelogram lifting structure that is operated by a foot-operated lever. In using such a device, a person must hold the motorcycle in proper position over the lift stand and, at the same time, balance one's self on one foot as the other foot is used for cranking the foot-operated lever. Some persons may have difficultly in maintaining their balance while holding onto the motorcycle and while operating the foot-operated pedal. In this respect, it would be desirable if a motorcycle lifting device were provided that permits a motorcycle to be lifted without using a foot-operated lever.

Still other features would be desirable in a motorcycle stand apparatus. For example, when the motorcycle stand apparatus is not being used, it would be desirable if the apparatus could be folded into a relatively flat arrangement for storage. When a motorcycle is rolled along the ground, the motorcycle has an amount of momentum. In this respect, it would be desirable if the momentum of a rolling motorcycle could be used for lifting a portion of the motorcycle off of the ground.

Once a motorcycle is in an elevated position above the ground on a stand, the weight of the motorcycle under the influence of gravity is an inherent force that is present on the stand. In this respect, it would be desirable if the inherent weight of the motorcycle on the stand could be used in locking the motorcycle in the elevated position on the stand.

Thus, while the foregoing body of prior art indicates it to be well known to use motorcycle lifting devices, the prior art described above does not teach or suggest a motorcycle stand apparatus which has the following combination of desirable features: (1) does not employ hydraulic cylinders and locking ratchets; (2) can be operated in a hands-free manner so that the person's hands can remain on the motorcycle even as the lifting device is being employed; (3) does not have ground-engaging rollers that contact the ground as the motorcycle is being lifted; (4) permits a motorcycle to be lifted without using a foot-operated lever; (5) can be folded into a relatively flat arrangement for storage; (6) employs momentum of a rolling motorcycle for lifting a portion of the motorcycle off of the ground; and (7) employs the inherent weight of the motorcycle on the stand for locking the motorcycle in the elevated position on the stand. The foregoing desired characteristics are provided by the unique motorcycle stand apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a motorcycle stand apparatus which includes a base frame assembly which includes a first longitudinal frame member, a second longitudinal frame member, and a transverse frame member connected between the first longitudinal frame member and the second longitudinal frame member. A first leg assembly which has a top end and a bottom end, and a pair of first leg bottom pivots are connected between the bottom end of the first leg assembly and the first longitudinal frame member and the second longitudinal frame member. A second leg assembly has a top end and a bottom end, and a pair of second leg bottom pivots are connected between the bottom end of the second leg assembly and the first longitudinal frame member and the second longitudinal frame member. A lift platform has a first platform side and a second platform side. A pair of first leg top pivots are connected between the top end of the first leg assembly and the first platform side and the second platform side. A pair of second leg top pivots are connected between the top end of the second leg assembly and the first platform side and the second platform side. A push plate assembly includes a bottom push plate end and a top push plate end, and the bottom push plate end is connected to the transverse frame member. Pull cables are connected between the top push plate end and the first leg assembly. Lift platform stops are located on either the first leg assembly or the second leg assembly for stopping vertical descending motion of the lift platform in a direction towards the push plate assembly. The first leg assembly includes a pair of leg risers, and a transverse leg brace member is connected between bottom portions of the leg risers.

The second leg bottom pivots includes pivot fingers projecting from the first longitudinal frame member and the second longitudinal frame member. Finger-reception channels in the transverse leg brace member receive the pivot fingers. The push plate assembly includes a first push plate member connected to the transverse frame member. A second push plate member is connected to the pull cables, and a push plate hinge assembly is connected between the first push plate member and the second push plate member. A push plate spring is connected between the first push plate member and the second push plate member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle stand apparatus which has all of the advantages of the prior art and none of the disadvantages.

It is another object of the present invention to provide a new and improved motorcycle stand apparatus which may be easily and efficiently manufactured and marketed.

It is a further object of the present invention to provide a new and improved motorcycle stand apparatus which is of durable and reliable construction.

An even further object of the present invention is to provide a new and improved motorcycle stand apparatus which is susceptible of a low cost of manufacture with regard to both materials and labor, and which accordingly is then susceptible of low prices of sale to the consuming public, thereby making such motorcycle stand apparatus available to the buying public.

Still yet a further object of the present invention is to provide a new and improved motorcycle stand apparatus which does not employ hydraulic cylinders and locking ratchets.

Still another object of the present invention is to provide a new and improved motorcycle stand apparatus that can be operated in a hands-free manner so that the person's hands can remain on the motorcycle even as the lifting device is being employed.

Yet another object of the present invention is to provide a new and improved motorcycle stand apparatus which does not have ground-engaging rollers that contact the ground as the motorcycle is being lifted.

Even another object of the present invention is to provide a new and improved motorcycle stand apparatus that permits a motorcycle to be lifted without using a foot-operated lever.

Still a further object of the present invention is to provide a new and improved motorcycle stand apparatus which can be folded into a relatively flat arrangement for storage.

Yet another object of the present invention is to provide a new and improved motorcycle stand apparatus that employs momentum of a rolling motorcycle for lifting a portion of the motorcycle off of the ground.

Still another object of the present invention is to provide a new and improved motorcycle stand apparatus which employs the inherent weight of the motorcycle on the stand for locking the motorcycle in the elevated position on the stand.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
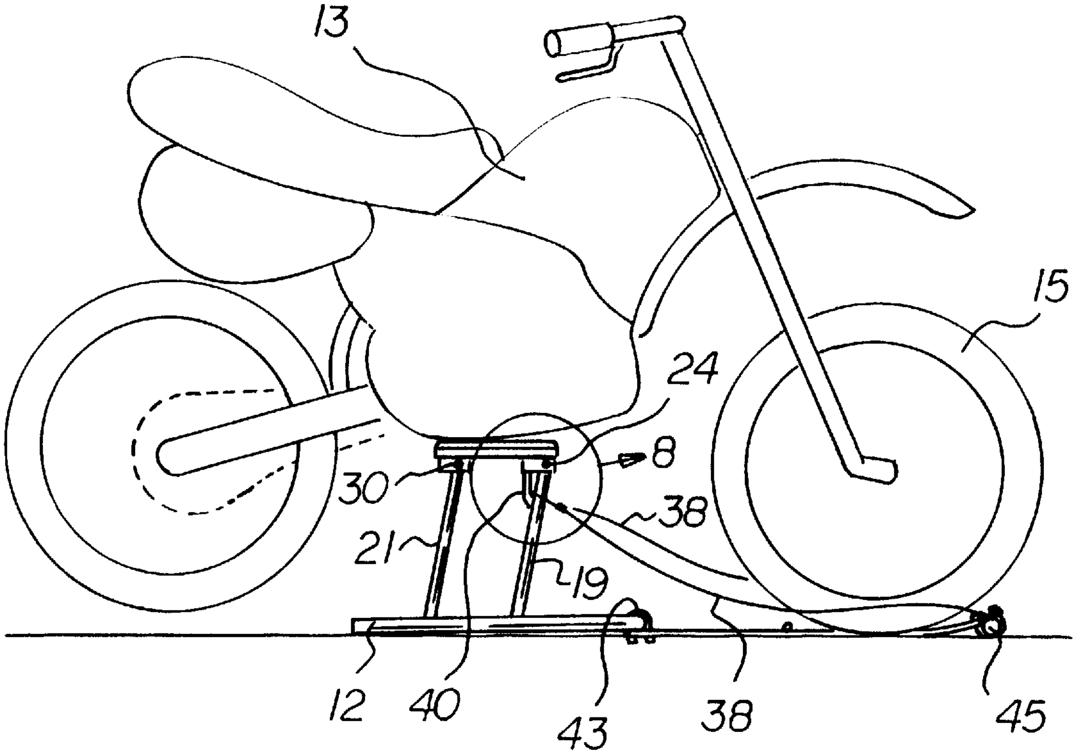
FIG. 1 is a side view showing a preferred embodiment of the motorcycle stand apparatus of the invention in use lifing the central and rear portions of the motorcycle off of the ground.

With reference to the drawings, a new and improved motorcycle stand apparatus embodying the principles and concepts of the present invention will be described.

Turning to FIGS. 1–8, there is shown an exemplary embodiment of the motorcycle stand apparatus of the invention generally designated by reference numeral 10. In its preferred form, motorcycle stand apparatus 10 includes a base frame assembly which includes a first longitudinal frame member 12, a second longitudinal frame member 14, and a transverse frame member 16 connected between the first longitudinal frame member 12 and the second longitudinal frame member 14. A first leg assembly which has a top end and a bottom end, and a pair of first leg bottom pivots 18 are connected between the bottom end of the first leg assembly and the first longitudinal frame member 12 and the second longitudinal frame member 14. A second leg assembly 21 has a top end and a bottom end, and a pair of second leg bottom pivots 20 are connected between the bottom end of the second leg assembly 21 and the first longitudinal frame member 12 and the second longitudinal frame member 14. A lift platform 22 has a first platform side 26 and a second platform side 28. A pair of first leg top pivots 24 are connected between the top end of the first leg assembly and the first platform side 26 and the second platform side 28. A pair of second leg top pivots 30 are connected between the top end of the second leg assembly 21 and the first platform side 26 and the second platform side 28. A push plate assembly 32 includes a bottom push plate end 34 and a top push plate end 36, and the bottom push plate end 34 is connected to the transverse frame member 16. Pull cables 38 are connected between the top push plate end 36 and the first leg assembly. Lift platform stops 40 are located on either the first leg assembly or the second leg assembly 21 for stopping vertical descending motion of the lift platform 22 in a direction towards the push plate assembly 32. The first leg assembly includes a pair of leg risers 19, and a transverse leg brace member 23 is connected between bottom portions of the leg risers 19.

The second leg bottom pivots 20 includes pivot fingers 25 projecting from the first longitudinal frame member 12 and the second longitudinal frame member 14. Finger-reception channels 27 in the transverse leg brace member 23 receive the pivot fingers 25. The push plate assembly 32 includes a first push plate member 33 connected to the transverse frame member 16. A second push plate member 35 is connected to the pull cables 38, and a push plate hinge assembly 37 is connected between the first push plate member 33 and the second push plate member 35. U-shaped bolts 43 are used to connect the first push plate member 33 to the transverse frame member 16. U-shaped bolts 43 are also used to connect a cable end retainer 45 to the second push plate member 35. push plate spring 39 is connected between the first push plate member 33 and the second push plate member 35.

Figure 2:
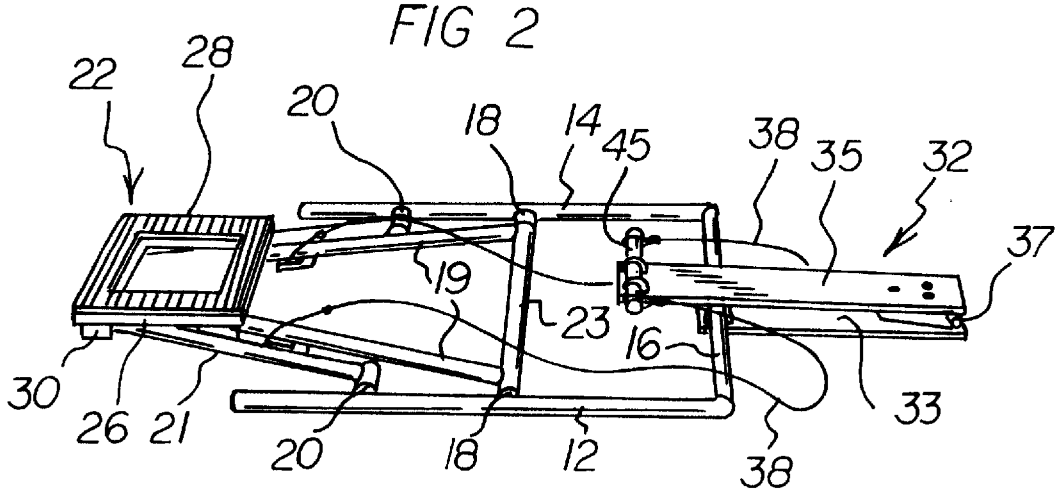
FIG. 2 is a perspective view of the embodiment of the motorcycle stand apparatus shown in FIG. 1, with the motorcycle removed and with the apparatus in a folded orientation suitable for storage.

To use the motorcycle stand apparatus 10, the apparatus is first taken out of storage from the storage orientation shown in FIG. 2. In the storage orientation, the lift platform 22 is on nearly the same vertical level as the first longitudinal frame member 12, the second longitudinal frame member 14, and the transverse frame member 16. Also, in the storage orientation, the push plate spring 39 urges the second push plate member 35 to be oriented flatly opposed to the first push plate member 33. In the storage orientation, the pull cables 38 are slack.

Figure 3:
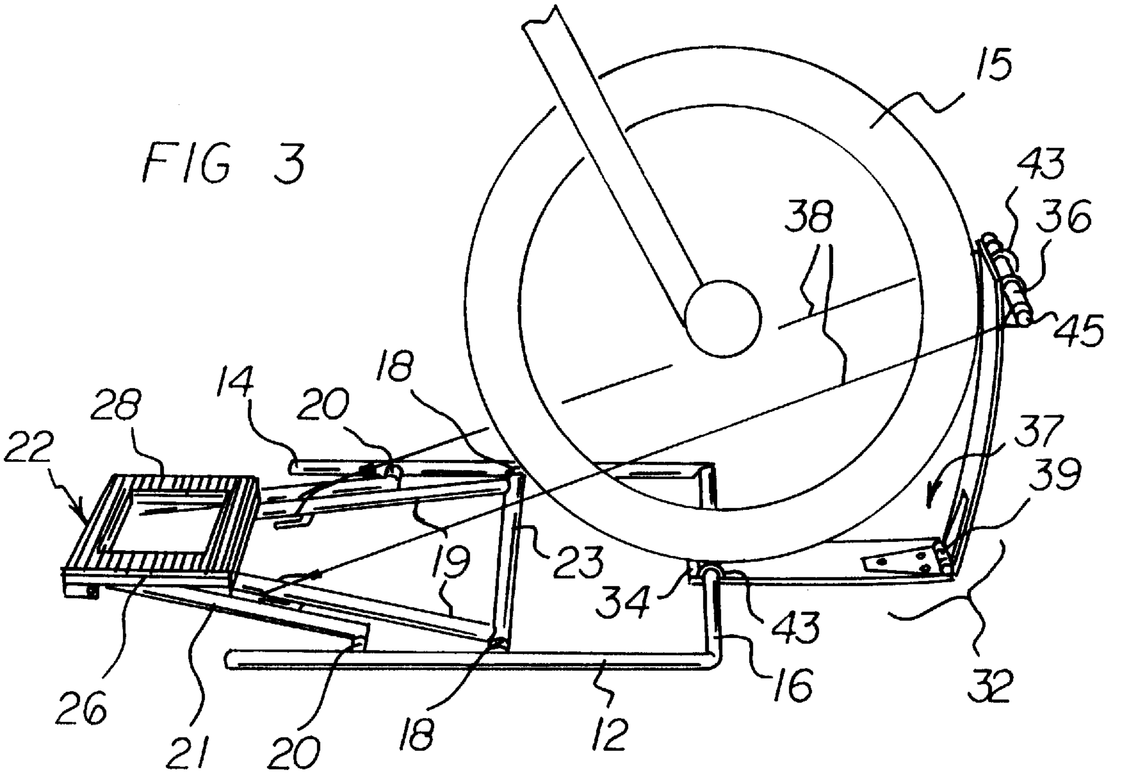
FIG. 3 is a perspective view of the embodiment of the motorcycle stand apparatus of FIG. 2, unfolded, and in a first stage of use for lifting a motorcycle.

When the motorcycle stand apparatus 10 is to be used, the second push plate member 35 is lifted by a person and is rotated around the first push plate member 33 by of the push plate hinge assembly 37. When this is done, the bias force of the push plate spring 39 is overcome. Then, as shown in FIG. 3, the front wheel 15 of a motorcycle 13 rested against the first push plate member 33 and the second push plate member 35, and the motorcycle 13 is pushed so that the front wheel 15 moves in a direction away from the lift platform 22. As this is done, the motorcycle 13 gains an amount of rolling momentum, and the front wheel 15 rolls against the push plate assembly 32. As the front wheel 15 continues to roll against the push plate assembly 32, the pull cables 38 become taut, as shown in FIG. 3.

Figure 4:
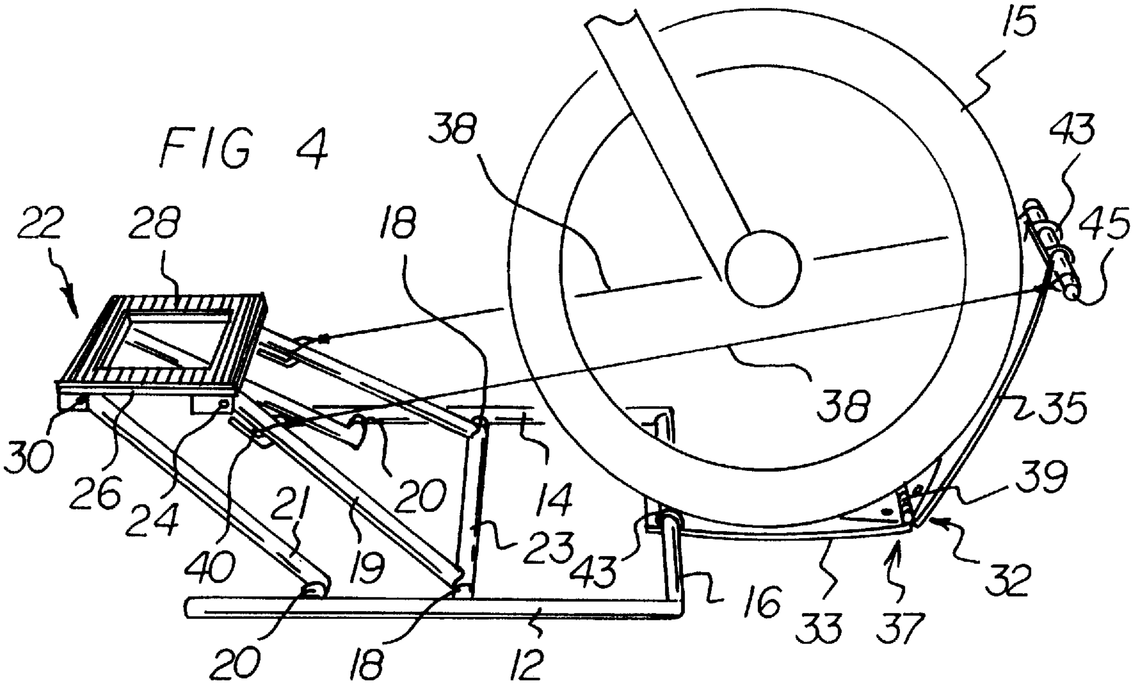
FIG. 4 is a perspective view of the embodiment of the motorcycle stand apparatus of FIG. 3 in a second stage of use for lifting a motorcycle.
Figure 5:
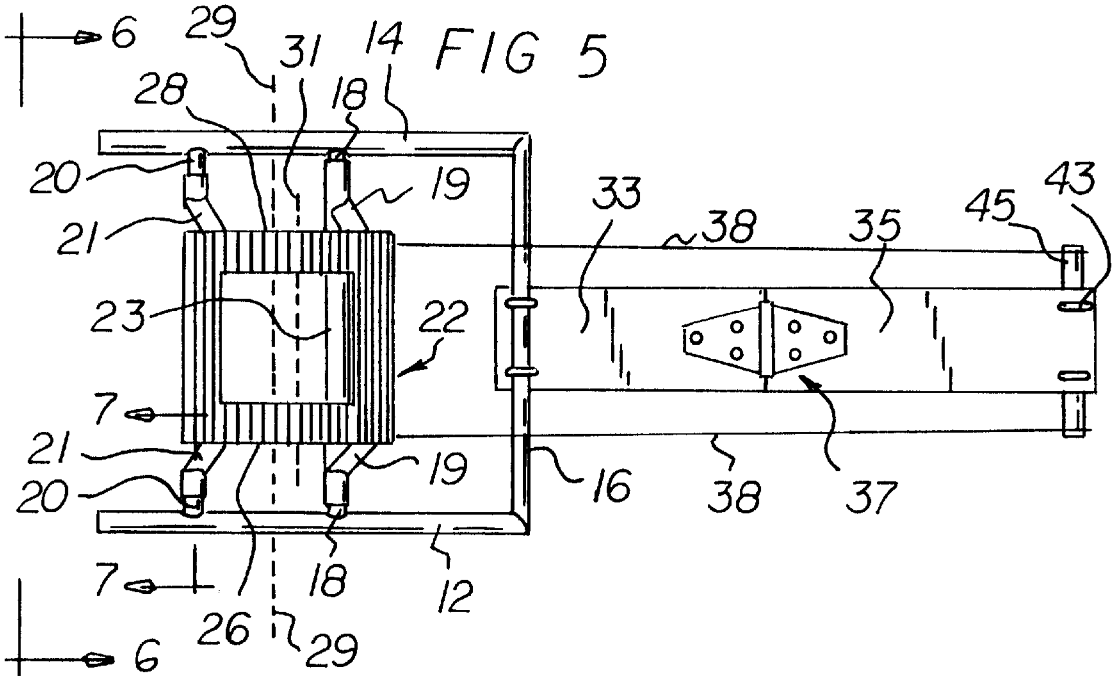
FIG. 5 is a top view of the embodiment of the motorcycle stand apparatus of FIG. 4 in a third and final stage of use for lifting a motorcycle, wherein, for purposes of clarity, the motorcycle is not present in the figure.
Figure 6:
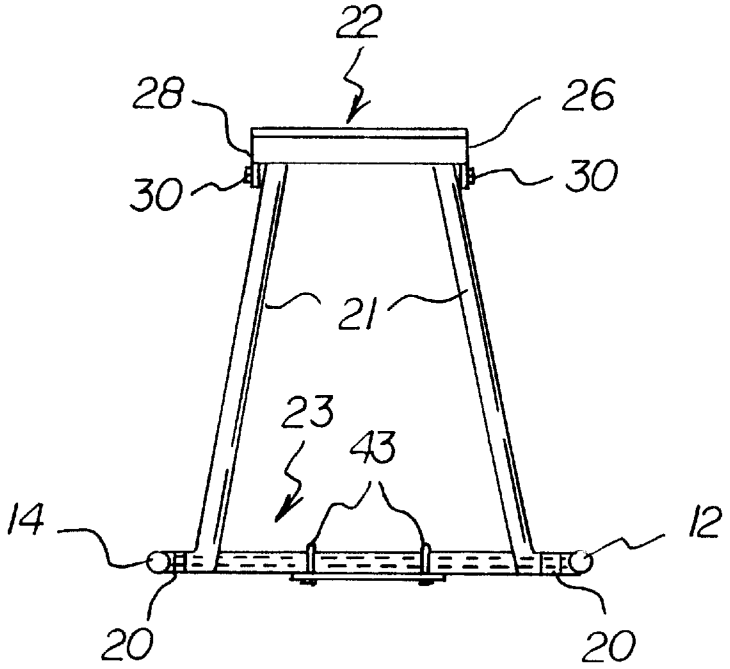
FIG. 6 is an enlarged rear view of the embodiment of the invention shown in FIG. 5 taken along line 6—6 thereof.
Figure 7:
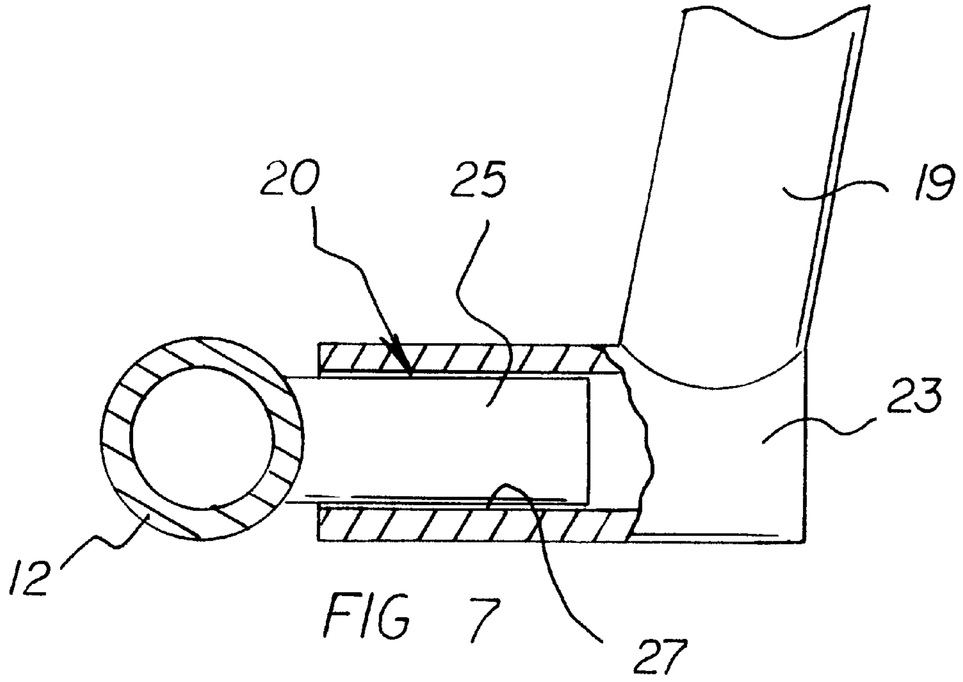
FIG. 7 is an enlarged partial cross-sectional view of the embodiment of the invention shown in FIG. 5 taken along line 7—7 thereof.
Figure 8:
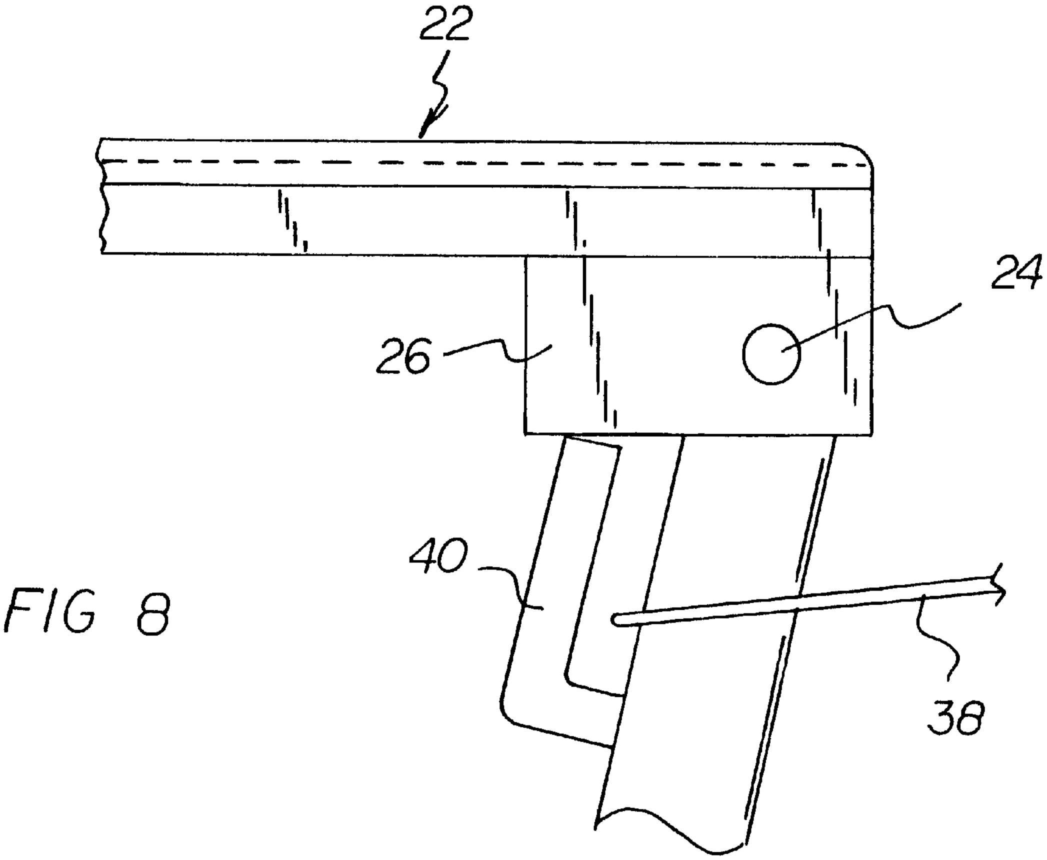
FIG. 8 is an enlarged side view of the portion of the embodiment of the invention shown in FIG. 1 in circled region 8 thereof.

As the front wheel 15 continues to roll over the push plate assembly 32, the pull cables 38 pull up the lift platform 22, the leg risers 19, and the second leg assembly 21, as shown in FIG. 4. As the front wheel 15 continues to roll over the push plate assembly 32, the lift platform 22 moves under the mid-portion of the motorcycle 13. As the front wheel 15 continues to roll over the push plate assembly 32, the rolling momentum of the motorcycle 13 causes the lift platform 22 to lift a portion of the motorcycle 13 off of the ground. With further movement of the front wheel 15 on the push plate assembly 32, the lift platform 22 lifts a portion of the motorcycle 13 and the middle portion 31 of the lift platform 22 over the mid-line 29 between the pairs of first leg bottom pivots 18 and the pairs of second leg bottom pivots 20 along the first longitudinal frame member 12 and the second longitudinal frame member 14. Once the middle portion 31 of the lift platform 22 crosses the mid-line 29, the lift platform 22 and the portion of the motorcycle 13 supported by the lift platform 22 begin to fall towards the ground. Then, the lift platform stops 40 prevent further fall of the lift platform 22 towards the ground. As a result, the lift platform stops 40, the leg risers 19, the transverse leg brace member 23, the second leg assembly 21, and the lift platform 22 support the motorcycle 13 on the apparatus.

To remove the motorcycle 13 from the motorcycle stand apparatus 10, the motorcycle 13 is moved in a direction away from the push plate assembly 32. As the motorcycle 13 is moved away from the push plate assembly 32, the push plate spring 39 helps urge the second push plate member 35 into continued contact with the front wheel 15, and the motorcycle 13 is raised as the middle portion 31 of the lift platform 22 approaches the mid-line 29 between the pairs of first leg bottom pivots 18 and the pairs of second leg bottom pivots 20 along the first longitudinal frame member 12 and the second longitudinal frame member 14. Once the middle portion 31 of the lift platform 22 passes the mid-line 29, the motorcycle 13 and the lift platform 22 are lowered to the ground as the motorcycle 13 continues to move away from the push plate assembly 32. Once the motorcycle 13 is supported entirely by the ground, the lift platform 22 continues to be further lowered toward the ground and finally rests on the ground as shown in FIG. 2. Then, the second push plate member 35 can be rotated around the push plate hinge assembly 37 towards the first push plate member 33 so that the push plate assembly 32 is in the storage position shown in FIG. 2. The push plate spring 39 helps retain the push plate assembly 32 in the storage position shown in FIG. 2.

The components of the motorcycle stand apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved motorcycle stand apparatus that is low in cost, relatively simple in design and operation, and which may advantageously be used without employing hydraulic cylinders and locking ratchets. With the invention, a motorcycle stand apparatus is provided which can be operated in a hands-free manner so that the person's hands can remain on the motorcycle even as the lifting device is being employed. With the invention, a motorcycle stand apparatus is provided which does not have ground-engaging rollers that contact the ground as the motorcycle is being lifted. With the invention, a motorcycle stand apparatus is provided which permits a motorcycle to be lifted without using a foot-operated lever. With the invention, a motorcycle stand apparatus is provided which can be folded into a relatively flat arrangement for storage. With the invention, a motorcycle stand apparatus is provided which employs momentum of a rolling motorcycle for lifting a portion of the motorcycle off of the ground. With the invention, a motorcycle stand apparatus is provided which employs the inherent weight of the motorcycle on the stand for locking the motorcycle in the elevated position on the stand.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the united states is as follows:

1. A motorcycle stand apparatus, comprising:

a base frame assembly, a first leg assembly which has a top end and a bottom end, a pair of first leg bottom pivots connected between said bottom end of said first leg assembly and said base frame assembly, a second leg assembly which has a top end and a bottom end, a pair of second leg bottom pivots connected between said bottom end of said second leg assembly and said base frame assembly, a lift platform, a pair of first leg top pivots connected between said top end of said first leg assembly and said lift platform, a pair of second leg top pivots connected between said top end of said second leg assembly and said lift platform, a push plate assembly which includes a first push plate end and a second push plate end, wherein said first push plate end is connected to said base assembly, pull cables connected between said second push plate end and said first leg assembly, and lift platform stops located on either said first leg assembly or said second leg assembly for limiting vertical descending motion of said lift platform in a direction towards said push plate assembly.

2. The apparatus of claim 1 wherein said first leg assembly includes:

a pair of leg risers, and a transverse leg brace member connected between bottom portions of said leg risers, said transverse leg brace member being pivotally connected to said base assembly.

3. The apparatus of claim 1 wherein said base frame assembly includes a first longitudinal frame member, a second longitudinal frame member, and a transverse frame member connected between said first longitudinal frame member and said second longitudinal frame member and said second leg bottom pivots include:

pivot fingers projecting from said first longitudinal frame member and said second longitudinal frame member, and finger-reception channels in said transverse leg brace member for receiving said pivot fingers.

4. The apparatus of claim 1 wherein said push plate assembly includes:

a push plate hinge assembly connected between said first push plate end and said second push plate end.

5. The apparatus of claim 4, further including:

a push plate spring connected between said first push plate end and said second push plate end.

* * * * *